(No Model.)
T. H. PARKER & J. GEARY.
WINDOW SPRING FOR ELECTRIC BURGLAR ALARMS.
No. 353,269.    Patented Nov. 23, 1886.
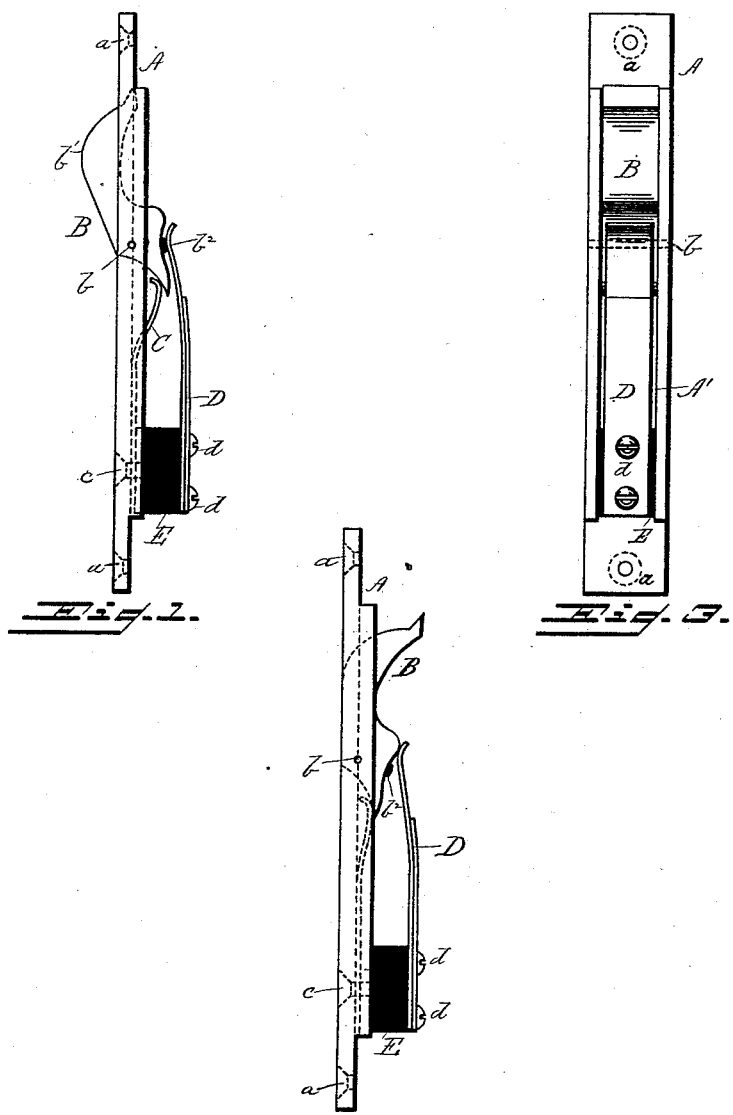
WITNESSES
Will be Powell.
J. B. McGirr.
INVENTORS
Theodore H. Parker
John Geary
By Connolly Bros.
Attorneys.

UNITED STATES PATENT OFFICE.

THEODORE H. PARKER AND JOHN GEARY, OF PHILADELPHIA, PENNSYLVANIA, ASSIGNORS TO SHAW & GEARY, OF SAME PLACE.

WINDOW-SPRING FOR ELECTRIC BURGLAR-ALARMS.

SPECIFICATION forming part of Letters Patent No. 353,269, dated November 23, 1886.

Application filed July 12, 1886. Serial No. 207,814. (No model.)

*To all whom it may concern:*

Be it known that we, THEODORE H. PARKER and JOHN GEARY, citizens of the United States, residing at Philadelphia, in the county of Philadelphia and State of Pennsylvania, have invented certain new and useful Improvements in Window-Springs for Electric Burglar-Alarms; and we do hereby declare the following to be a full, clear, and exact description of the invention, reference being had to the accompanying drawings, which form part of this specification, in which—

Figure 1 is a side elevation of our invention, showing normal position of parts. Fig. 2 is a side elevation showing position of parts when the cam-block is pushed in and springs in a state of tension. Fig. 3 is a rear elevation.

Our invention has relation to the "window-springs" of electric burglar-alarms; and our improvements have for their object to provide a construction whereby the danger of the spring becoming "set" or inert will be avoided.

Our improvements consist in the peculiar construction and combination of parts hereinafter described, having reference particularly to the combination, with the cam by the movement of which the electric circuit is opened or closed, of two springs on opposite sides thereof, both of said springs tending to resist the movement of the cam in one direction.

Referring to the accompanying drawings, A represents a slotted plate, forming a bracket or frame for a metal cam or block, B, pivoted or fulcrumed therein at $b$, and fitting in the slot A'. Said plate or bracket is designed to be attached to the frame of a window in such manner that when a sash thereof is moved such sash, impinging against the projecting side $b'$ of said cam B, will rock or tilt the latter on its fulcrum. Said plate A may be fastened to the window-frame by screws passed through the openings $a$, or in any other suitable manner.

C and D represent metallic springs, the spring C being fastened to the plate A by a screw, $c$, and the spring D to an insulating-block, E, on said plate by screws $d\ d$. The cam B has an insulating-piece, $b^2$, against which the spring D normally bears, and when it so does the electric circuit through the springs (which latter are designed to have connections, respectively, with the opposite poles of a cell or battery) is open or broken. When, however, by the impingement of a window-sash, the cam B is moved, the spring D comes in contact with said cam, which, being metallic, establishes the circuit between said springs. This would be the arrangement for an open circuit—*i. e.*, one normally open, and in which an alarm is given by closing; but for the opposite arrangement—*i. e.*, one in which the circuit is normally closed and the alarm is given when the circuit is opened—the insulating-piece $b^2$ should be so located that normally the spring D will bear against the cam B, and will be in contact with said insulating-piece $b^2$ only when said cam is moved or out of normal position. A mere change of location of the insulating-piece $b^2$ will adapt our invention for either open or closed circuit.

When the cam B is moved, as above set forth, it bends the springs C and D backwardly in opposite directions; but as they are on opposite sides of said cam they both tend to resist the movement of the latter and to restore it to its normal position. If one of the springs should be broken or become inert, the other could be relied upon for action.

It will be noted that the radii between the pivot or fulcrum $b$ and points of contact of both the springs with the cam B are equal or approximately equal, one spring contacting with said cam at a point above its fulcrum and the other at a point below. The points of contact of both springs with the cam are close to the fulcrum of the latter; hence when said cam is moved the springs are only slightly bent or flexed, and are not liable to set or become inactive by being allowed to remain in a state of flexion or tension for a considerable period of time.

It is not essential that both springs should be fastened, as shown, below the cam B, as one may be below and the other above the latter.

An advantage of our invention is that it is very compact, and when fitted in place in the window-frame will not interfere with the sash-weight when the latter is passing up and down.

What we claim as our invention is as follows:

1. An electric burglar-alarm attachment or device comprising a pivoted or fulcrumed cam or block, B, having an insulating-piece, $b^2$, and two springs, C D, bearing on said cam on opposite sides of the latter, both exerting pressure or tending to move said cam in the same direction, substantially as shown and described.

2. In an electric burglar-alarm window-spring, the combination, with a pivoted or fulcrumed cam or block, B, having an insulating-piece, $b^2$, of two springs, C and D, which bear upon said cam or block on opposite sides and at equal or approximately equal distances from its pivotal point or fulcrum, substantially as shown and described.

3. The window-spring for electric burglar-alarms herein described, and comprising plate A, having slot A', cam or block B, pivoted or fulcrumed therein at $b$ and having insulating-piece $b^2$, spring C, fastened to said plate A, and spring D, secured to insulation-piece E on plate A, said springs bearing on said cam or block on opposite sides of the latter, and both, when flexed, tending to move said cam or block in the same direction, substantially as shown and described.

In testimony that we claim the foregoing we have hereunto set our hands this 2d day of July, 1886.

THEODORE H. PARKER.
JOHN GEARY.

Witnesses:
 WILL H. POWELL,
 R. DALE SPARHAWK.